(No Model.)

J. HESS.
HARNESS SADDLE.

No. 346,750.  Patented Aug. 3, 1886.

WITNESSES:
Thos. Houghton.
P. B. Turpin.

INVENTOR:
Jacob Hess
BY Munn & Co.
ATTORNEYS.

UNITED STATES PATENT OFFICE.

JACOB HESS, OF MUSCATINE, IOWA.

HARNESS-SADDLE.

SPECIFICATION forming part of Letters Patent No. 346,750, dated August 3, 1886.

Application filed March 2, 1886. Serial No. 193,796. (No model.)

*To all whom it may concern:*

Be it known that I, JACOB HESS, of Muscatine, in the county of Muscatine and State of Iowa, have invented a new and useful Improvement in Harness-Saddles, of which the following is a description.

My invention is an improvement in harness-saddles, and relates particularly to the novel construction of the pad-plate or foundation, as will be described.

Figure 1:
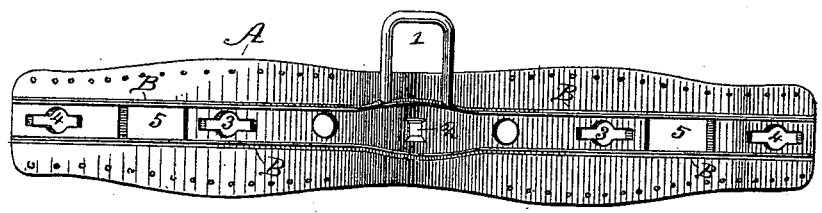
Figure 2:
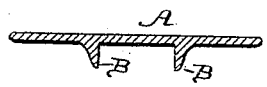
Figure 3:
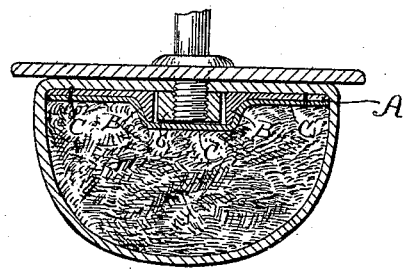
Figure 4:
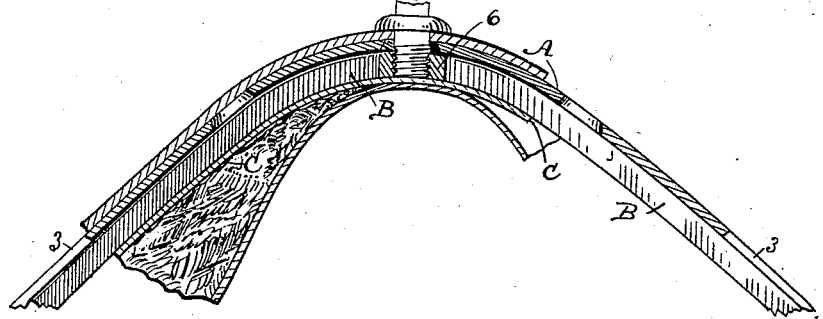

In the drawings, Figure 1 is a bottom plan view, and Fig. 2 a transverse section of my pad-plate. Fig. 3 is a transverse section of the completed saddle, and Fig. 4 is a partial longitudinal section thereof, all of which will be described.

The pad-plate A is usually a metal casting of the desired shape, formed centrally between its ends with a loop, 1, to which the strap running to the crupper may be attached. Through this plate A, at proper intervals, are formed the opening 2 for the check-rein hook, the openings 3 3 for the terrets, the openings 4 4 for the pad-screws, and the holes or openings 5 5 for the passage of the nuts for securing the hook, terrets, and pad-screws, which pad-screws, hook, and terrets may be of the ordinary construction. The pad-screws, hook, and terrets are secured by nuts 6 bearing against the under side of the plate. To prevent these nuts from turning loose I provide the under side of the plate with longitudinally-extended ribs or ridges B, ranging on opposite sides of the openings 2, 3, 4, and 5. These ridges are arranged apart a distance sufficiently short to prevent the nuts used between them from turning.

In constructing the saddle the leather on the under side is laced on the pad-plate, making the iron form both pad-plate and burr-piece combined, using no leather whatever for burr-piece. A cloth, C, may be stretched and secured along the under side of the plate A, to prevent the straw or other pad-stuffing from filling the holes for the screws. The nuts for the terrets and other screws may now be placed in position by passing them through openings 5 and adjusting them into register with the desired openings 2, 3, or 4, and the housing, &c., may be applied.

It will be seen that the openings 5 permit the nuts to be conveniently placed after the pad is built up and facilitate the removal of such nuts in case of breakage, or where it may be desired to change the style of the check-hook or terrets.

The plate is of simple construction, and facilitates and simplifies the construction and repairing of harness-saddles.

In practice the tree is only padded on opposite sides of its center part or crown, the latter being left bare on its under side. This portion, it will be seen, sustains the greater part of the strain of the device, and it therefore becomes an object to provide simple constructions whereby to brace and strengthen this portion of the tree or frame. To this end the ribs B, which are parallel to each other for the greatest part of their length, extend across the said central portion of the tree in lines arching outward toward the opposite edges of the tree, thus causing the said ribs to exert at such point a greater bracing action, and consequently strengthen the tree at the desired point.

Having thus described my invention, what I claim as new is—

1. A tree for harness-saddles, consisting of metal having its side portions inclined downward and uniting at the crown or center part, and provided with bracing-ribs, said ribs being bulged or arched outwardly toward the opposite edges of the tree at the center thereof, substantially as set forth.

2. The combination of a tree having openings, through which a nut may be placed, and ribs or guides, bulged or arched as described, and serving to direct the nut so placed to its desired position, the filling or stuffing, and a cover, C, stretched above the filling and between the same and the guideway for the nut; substantially as set forth.

JACOB HESS.

Witnesses:
CHAS. H. SPAETHE,
CHARLES A. FISCH.